United States Patent [19]

Quirijnen

[11] Patent Number: 4,978,877

[45] Date of Patent: Dec. 18, 1990

[54] MOUNTING DEVICE FOR BRUSHES IN A REVERSIBLE COMMUTATOR MOTOR

[75] Inventor: A. J. J. Quirijnen, Molenschot, Netherlands

[73] Assignee: Emerson Electric Co., Konijnenberg, Netherlands

[21] Appl. No.: 311,323

[22] Filed: Feb. 15, 1989

[30] Foreign Application Priority Data

Feb. 15, 1988 [NL] Netherlands ............ 8800366

[51] Int. Cl.⁵ ........................................... H02K 13/00
[52] U.S. Cl. ....................................... 310/239; 310/50; 310/71; 310/229; 310/238; 318/292
[58] Field of Search ................. 310/229, 230, 42, 231, 310/239, 238, 241, 248, 68 A, 47, 184, 50, 180, 71; 318/244, 245, 292, 491, 541, 280

[56] References Cited

U.S. PATENT DOCUMENTS

| | | |
|---|---|---|
| 2,764,705 | 9/1956 | Albertson ............ 318/541 |
| 3,440,465 | 4/1969 | Pratt ..................... 310/50 |
| 3,681,550 | 8/1972 | Perry ................... 310/230 |
| 4,342,931 | 8/1982 | Grossmann ........... 310/230 |
| 4,348,603 | 9/1982 | Huber ................. 310/68 A |
| 4,401,908 | 8/1983 | Cabaussel ............. 310/241 |
| 4,523,116 | 6/1985 | Dibbern, Jr. ........... 310/230 |
| 4,748,353 | 5/1988 | Klingenstein .......... 310/71 |

Primary Examiner—R. Skudy
Attorney, Agent, or Firm—Jones, Day, Reavis & Pogue

[57] ABSTRACT

The invention concerns a device for mounting a pair of carbon brushes in an electric hand tool. To allow for the reversibility of the motor the device is mounted rotatably relative to the shaft of the motor. Further, the device is also used on the switch for reversing the polarity of the field windings by having a handgrip extending outside of the motor housing and having contacts for contacting relative fixed contacting strip members. By further using a bayonet-shaped structure, construction is simplified and the number of total parts is reduced.

4 Claims, 3 Drawing Sheets

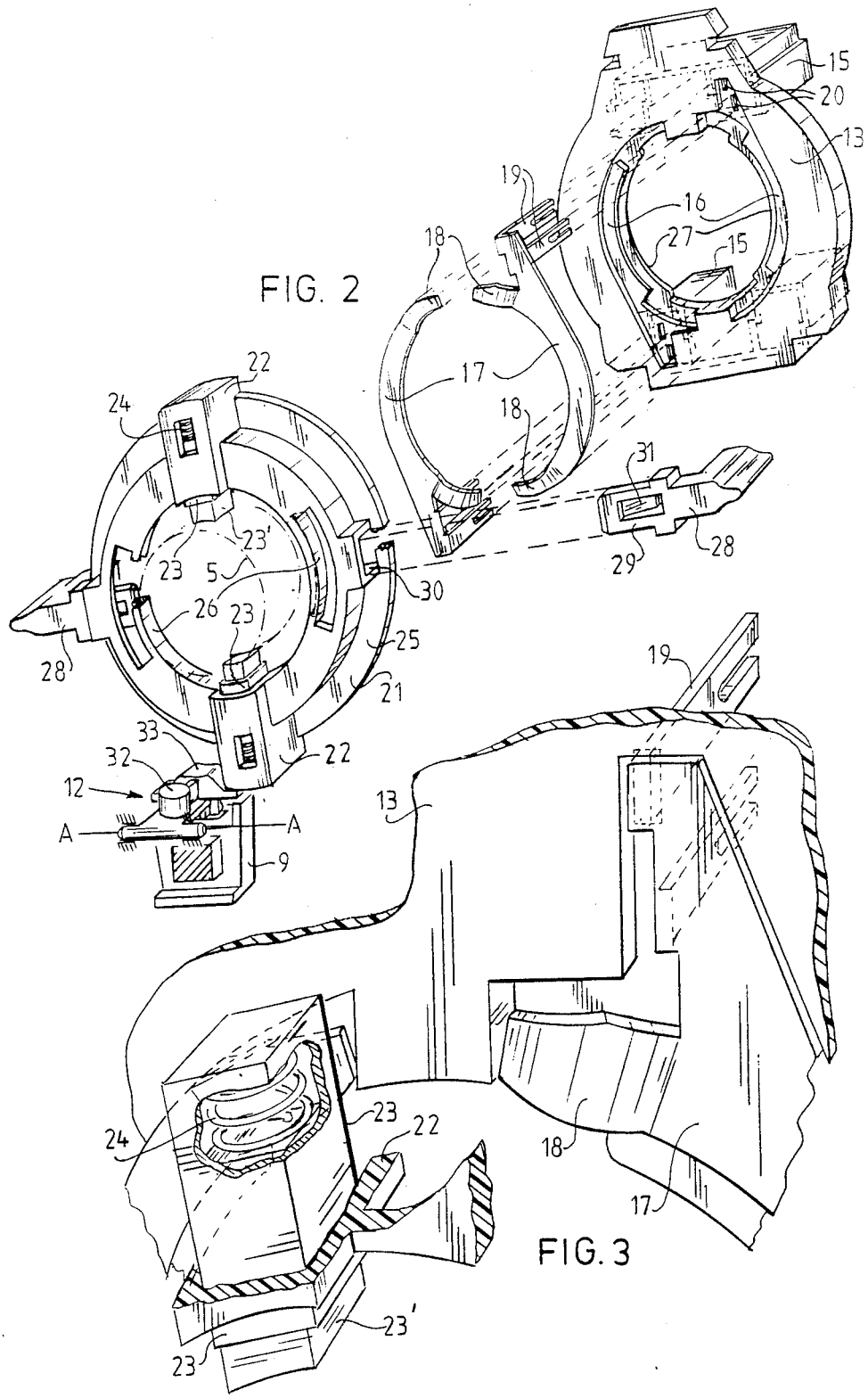

MOUNTING DEVICE FOR BRUSHES IN A REVERSIBLE COMMUTATOR MOTOR

BACKGROUND OF THE INVENTION

The invention relates to a device for mounting at least one pair of brush holders with brushes located diametrically opposite one another in a reversible commutator motor for electric hand tools, which device comprises a carrier for the brush holders rotatable concentrically around the motor shaft in addition to a stationary contact plate connected to each field coil.

With reversible motors for hand tools, for example rotary drills, use is often made of pairs of brushes located diametrically opposite one another which are rotated at a determined angle relative to the commutator in order to reverse the rotational direction of the electromotor. The design solutions known to date display a large number of parts which prevents a simple and therefore wholly or partially automated production method.

The object of the invention is to provide a design solution whereby the number of components is reduced to a minimum.

The device according to the invention is distinguished in that the contact plate is provided with two mutually separated contact strips, each provided with a plug and socket connection for the field coil contact whereby in each case the annular brush carrier displays a chamber open on one side for the accommodation of a brush carrier with brush, which open side is to be brought into contact with one of the contact strips.

The invention makes use of the possibility of using the brush not only in sliding contact with the commutator but also of using the brush carrier in sliding contact with the contact strips in the contact plate. Because the position of the brushes relative to the commutator has to be changed for reversing of the motor, use is also made of the possibility of switching over from the one contact strip to the other contact strip, which can take place simply with the surface of the brush carrier situated in the open side of the chamber. As a result the number of components in such a reversing device is considerably reduced.

The rotary connection between brush carrier and contact plate can be effected in a simple manner according to the invention through the use of a bayonet closure.

The operation of the rotatable brush carrier is simply achieved by providing the brush carrier with a hand grip which extends outside the motor housing so that it is accessible for the user.

In order to prevent the actuation of the reversing device while the motor is running a locking device is employed according to the invention which co-acts with the on-off switch of the motor power supply. This locking device is preferably operated according to the invention by the brush carrier or the brush chamber integrally arranged therein.

Above mentioned and other features will be further elucidated in the figure descriptions hereinafter of an embodiment according to the invention.

BRIEF DESCRIPTION OF THE DRAWINGS

FIG. 2 shows a perspective exploded view of the brush holder with contact plate and locking device suitable for a hand tool according to FIG. 1, FIG. 3 shows a perspective view on an enlarged scale of a part of the brush carrier and holder with the co-acting part of the contact plate.

DETAILED DESCRIPTION OF THE PREFERRED EMBODIMENTS

Figure 1:
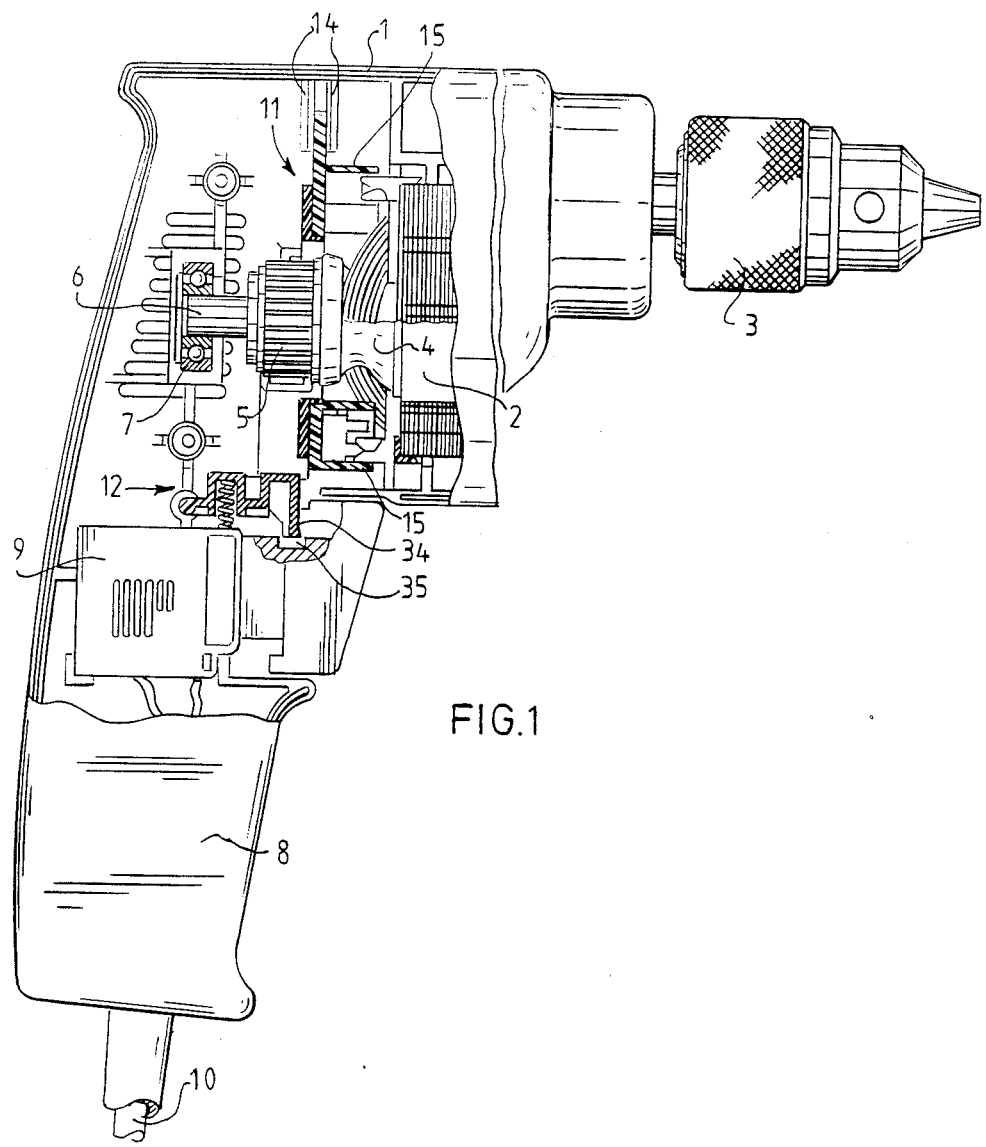
FIG. 1 is a side view with partly broken away motor housing of a hand tool in the form of a rotary drill provided with a reversible commutator motor according to the invention.

The hand tool according to FIG. 1 consists usually of a motor or machine housing 1 of shaped plastic material which comprises an electromotor 2 as well as the transmission to a tool holder 3. The rotor 4 of the electromotor is provided with a commutator 5 whereby the motor shaft 6 is mounted in a roller bearing 7 supported by the housing 1. Arranged in the hand grip 8 of the housing is a finger-operated on-off switch 9 for the power supply to the electromotor 2 fed to the switch 9 via the line 10.

The invention relates to the part 11 around the commutator 5 and the locking device 12 on the top side of the switch 9.

This part 11 is shown in detail in FIG. 2. It can be seen here that a contact plate 13 of suitable insulating material is shaped such that it fits between the support ribs 14 arranged in the housing 1, see also FIG. 1, as a result of which this plate 13 can be mounted in a stationary position around the motor shaft 6 and commutator 5 in the housing 1. Protective parts 15 are arranged on the rear side of the plate 13 in FIG. 2, in which parts the connection takes place to the clamps of the ends of the stator winding of the motor.

The front side of the plate 13 is provided with recesses 16, wherein in each case two semi-annular contact strips 17 can be placed. The contact strips 17 are identical in form but in mounted position are situated symmetrically relative to one another. The contact strips 17 take a substantially flat form with at the ends a slightly curved portion 18 which is slightly resilient in axial direction with respect to the plate 13. Each contact strip 17 is further formed with two forks or plugs 19 which can be passed through holes or sockets 20 in the plate 13 into the part 15, which forks 19 come into contact with the ends of the field or stator windings (not shown). It should be noted that only one of the two forks is in operation depending on the sort of winding used in the stator. Each contact strip 17 is accommodated in loose but close-fitting position in a correspondingly shaped chamber of contact plate 13, facilitating mounting.

Shown at bottom left in FIG. 2 is the brush carrier 21, which is provided with two chambers 22 formed with closed bottom wall and placed diametrically opposite one another, each of which accommodates a brush holder 23 having a brush 23' which is radially slidable therein. The chamber 22 has a rectangular cross section so that axial mounting of the holder 23 can take place. The side of the chamber facing away from the commutator 5 is closed so that a spring of random type 24 arranged therein presses the brush holder 23 against this side of the chamber and biases the brush 23' in the direction of the commutator.

A feature of the invention is that the chamber 22 is open on the side facing the contact strips 17 so that the read side of the brush holder 23 in FIG. 3 can come into direct contact with the curved portion 18 of each contact strip 17.

Figures 4, 5:
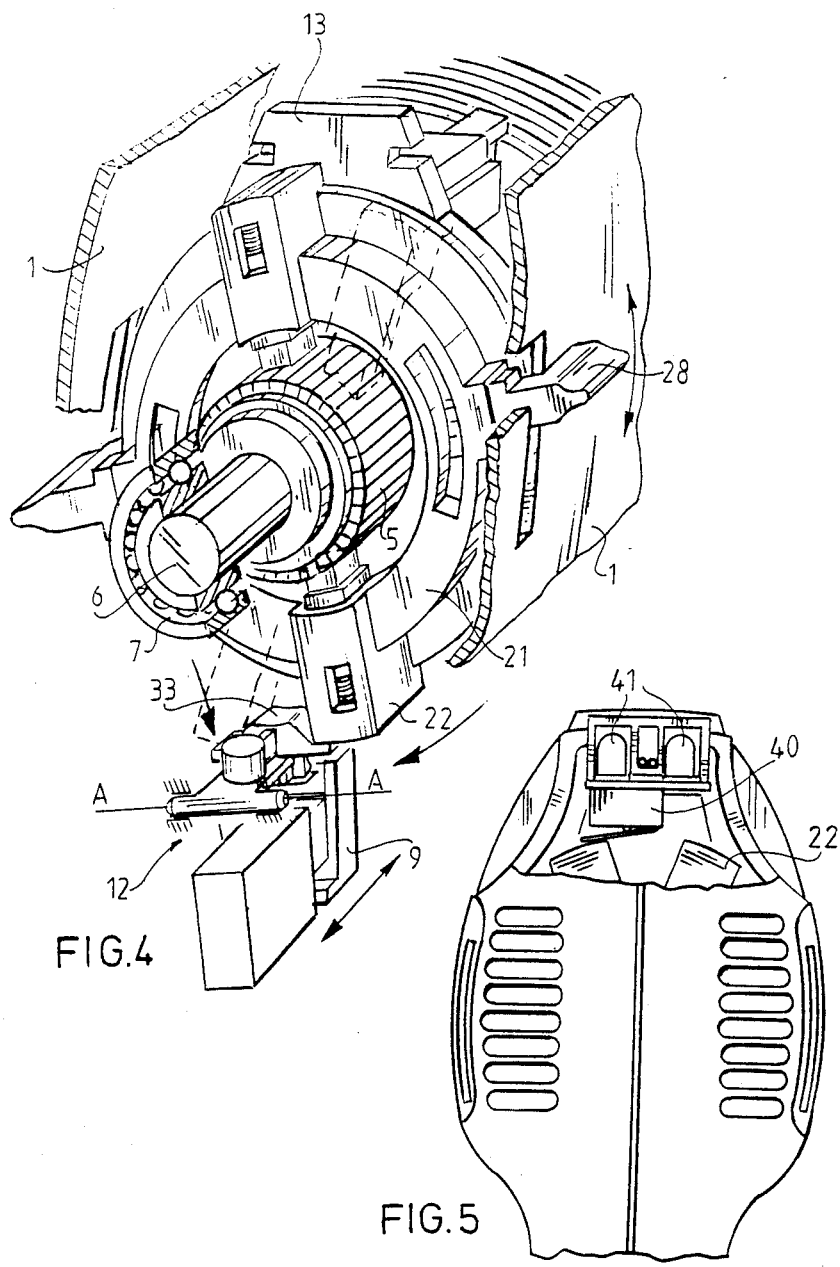
FIG. 4 shows a perspective view corresponding to FIGS. 2 and 3 of the various components in a mounted state.
FIG. 5 shows an axial view of a detail of the rotational direction indicator operated through a chamber.

The brush carrier 21, likewise made of insulating material, has an encircling flange 25 which supports against the front side of contact plate 13. The inner side of the flange 25 is executed with two parts 26, between which is kept a determined opening. The contact plate 13 is moreover embodied with two inwardly facing ribs 27 between which an opening is likewise kept, which make it possible to connect the brush carrier 21 with the plate 13 to turn. For this purpose the brush carrier has to be turned through approximately 90° from the position shown in FIG. 2 and brought against the plate 13 such that the parts 26 can be carried into the recess between the ribs 27, whereupon through being turned back the parts 26 grip behind the ribs 27. In this way a connection is achieved between the brush holders 23 and the contact strips 17 by turning the brush carrier 21 through a small angle, which is apparent from FIG. 4.

Here the one position of the brush carrier is indicated with an unbroken line while the other position of the brush carrier is shown by a dotted line.

In order to be able to turn the brush carrier 21 finger grips 28 are arranged on either side thereof. These finger grips 28 are separate injection moulded bodies formed with a resilient foot 29 which can be introduced into a chamber 30 of the brush carrier 21. The resilient lip 31 in the foot 29 hooks behind an edge of the flange 25 so that when a foot 29 is introduced this is locked in the chamber 30. The end of the finger grip 28 facing away from the foot 29 protrudes outside the motor housing 1, see FIG. 4, so that the user can slide the brush carrier 21 with a finger from the one position to the other and back again.

In order to prevent an unexpected rotation of the brush carrier 21 when the motor is energised a locking device 12 is mounted above the hand switch 9 in a hand grip 8, see FIG. 1. The locking device is a formed piece which is arranged in the housing 1 or hand grip 8 for rotation about an axis A—A and which form piece has a chamber 32 for accommodating a pressure spring. Arranged next to the chamber 32 is a cam 33 which co-acts with a brush chamber 22. The cam is formed with a downward directed nose 34, see FIG. 1, which is to be inserted into a recess 35 of the switch 9 in the hand grip 8.

It will be apparent that in the rotation of the brush carrier 21 the chamber 22, closed to the outside and therefore insulated, is carried over the cam 33. To this end the cam 33 has to be pressed downward counter to the pressure force of the spring, which is only possible if the nose 34 can fall into the recess 35, that is, if the switch 9 is in the off-position, according to FIG. 1. The switch 9 cannot be actuated as long as the cam 33 falls into the recess 35. As soon as the cam 33 is released by the chamber 22 the spring pushes the nose 34 out of the recess 35 and the switch can be pressed in.

The cam 33 ensures on the other hand the correct positioning of the chamber 22 so that the correct brush position relative to the commutator and consequently the correct field angle is ensured. The rotational direction of the rotor can be indicated in a particularly simple manner by means of the upper brush chamber 22. This controls a microswitch 40 drawn in FIG. 5 which energises the one or the other light-emitting diode (LED) 41 corresponding with a left or right rotating rotor. Other, non-electrical indicators can of course also be used.

It is assumed that the working of the reversible commutator motor is well known so that a description thereof is not included here.

The invention is not limited to the above described embodiments. While the preferred embodiment has been described, variations thereto will occur to those skilled in the art within the scope of the present inventive concepts which are delineated by the following claims.

What is claimed is:

1. A device for mounting at least one pair of brush holders with brushes located diametrically opposite one another about a motor shaft of a reversible commutator motor for an electric hand tool, the motor including a field coil, the device including:

an annular carrier for said brush holders rotatable concentrically around the motor shaft; and a stationary contact plate connected to each field coil, whereby said contact plate is provided with two mutually separated contact strips and the annular carrier has a chamber open on one side for accommodating at least one of said brush holders with a brush, which open side faces towards one of the contact strips, wherein each contact strip is provided with a plug and said contact plate is provided with a socket for contacting the field coil, and the chamber has a closed outer wall and two parallel side walls situated in an axially located plane.

2. The device according to claim 1, wherein the annular carrier can be rotatably mounted onto the contact plate.

3. The device according to claim 1 or 2, wherein the rotatable annular carrier is provided with at least one finger grip protruding outside the motor housing.

4. The device according to claim 3, wherein the finger grip is provided with a slender shaft body which can be locked in the annular carrier.

* * * * *

UNITED STATES PATENT AND TRADEMARK OFFICE
CERTIFICATE OF CORRECTION

PATENT NO. : 4,978,877
DATED : December 18, 1990
INVENTOR(S) : A. J. J. Quirijnen It is certified that error appears in the above—identified patent and that said Letters Patent is hereby corrected as shown below:

ON THE TITLE PAGE: Item [73]

After "assignor to Emerson Electric Co.," delete "Konijnenberg, Netherlands" and insert therefor ---St. Louis, Missouri---.

Signed and Sealed this

Tenth Day of November, 1992

Attest:

DOUGLAS B. COMER

*Attesting Officer*   *Acting Commissioner of Patents and Trademarks*